United States Patent [19]
Greisz

[11] Patent Number: 5,730,770
[45] Date of Patent: Mar. 24, 1998

[54] TWO-STAGE AIR FILTER FOR USE WITH ELECTRONIC ENCLOSURES

[75] Inventor: Mark J. Greisz, Vancouver, Wash.

[73] Assignee: SEH America, Inc., Vancouver, Wash.

[21] Appl. No.: 785,526

[22] Filed: Jan. 17, 1997

[51] Int. Cl.⁶ .................................................. B01D 35/02
[52] U.S. Cl. ...................... 55/385.6; 55/486; 55/487; 55/524; 55/528
[58] Field of Search ...................... 55/385.6, 422, 55/485, 486, 527, DIG. 13, DIG. 42, 487, 528, 524

[56] References Cited

U.S. PATENT DOCUMENTS

| | | | |
|---|---|---|---|
| 4,889,542 | 12/1989 | Hayes | 55/385.6 |
| 5,223,006 | 6/1993 | Moran, III | 55/385.6 |
| 5,232,478 | 8/1993 | Parris | 55/104 |
| 5,431,974 | 7/1995 | Pierce | 55/385.6 |
| 5,462,569 | 10/1995 | Benjamin | 55/385.6 |
| 5,492,551 | 2/1996 | Wolfe | 55/527 |
| 5,525,136 | 6/1996 | Rosen | 55/486 |
| 5,573,811 | 11/1996 | Townsley | 55/DIG. 13 |

*Primary Examiner*—Richard L. Chiesa
*Attorney, Agent, or Firm*—Chernoff, Vilhauer, McClung & Stenzel, LLP

[57] ABSTRACT

A two-stage filter unit utilizing coarse and fine filter media in series, with the coarse filter media being detachable from a housing containing the fine filter media, the filter being especially suitable for filtration of cooling air taken in by electronic equipment.

6 Claims, 2 Drawing Sheets

TWO-STAGE AIR FILTER FOR USE WITH ELECTRONIC ENCLOSURES

BACKGROUND OF THE INVENTION

Electronic equipment components generate heat from their operation. Although most such equipment contains air filtration and ventilation devices to maintain the circuitry within dust-free and to prevent overheating, such devices are designed for an office environment, and are therefore totally inadequate for protecting the electronic components when the equipment is operated in a manufacturing environment, which is far more dirty. Since such electronic equipment is increasingly being used in process control in manufacturing environments and in particular in the silicon wafer production industry, the inadequacy of OEM-supplied filtration devices for electronic equipment has manifested itself in increasing amounts of down time and outright equipment failure. There is therefore a strong need for auxiliary filtration means to adequately protect electronic components in electronic equipment from dust infiltration. This need is met by the present invention, which is summarized and described in detail below.

SUMMARY OF THE INVENTION

The present invention is a two-stage air-filtering device that is simple in construction, easy to install and maintain and comprises two filter media operating in series, one capturing larger particulates and the other capturing smaller particulates. Both filter media are both washable and disposable.

DETAILED DESCRIPTION OF THE PREFERRED EMBODIMENT

Figure 1:
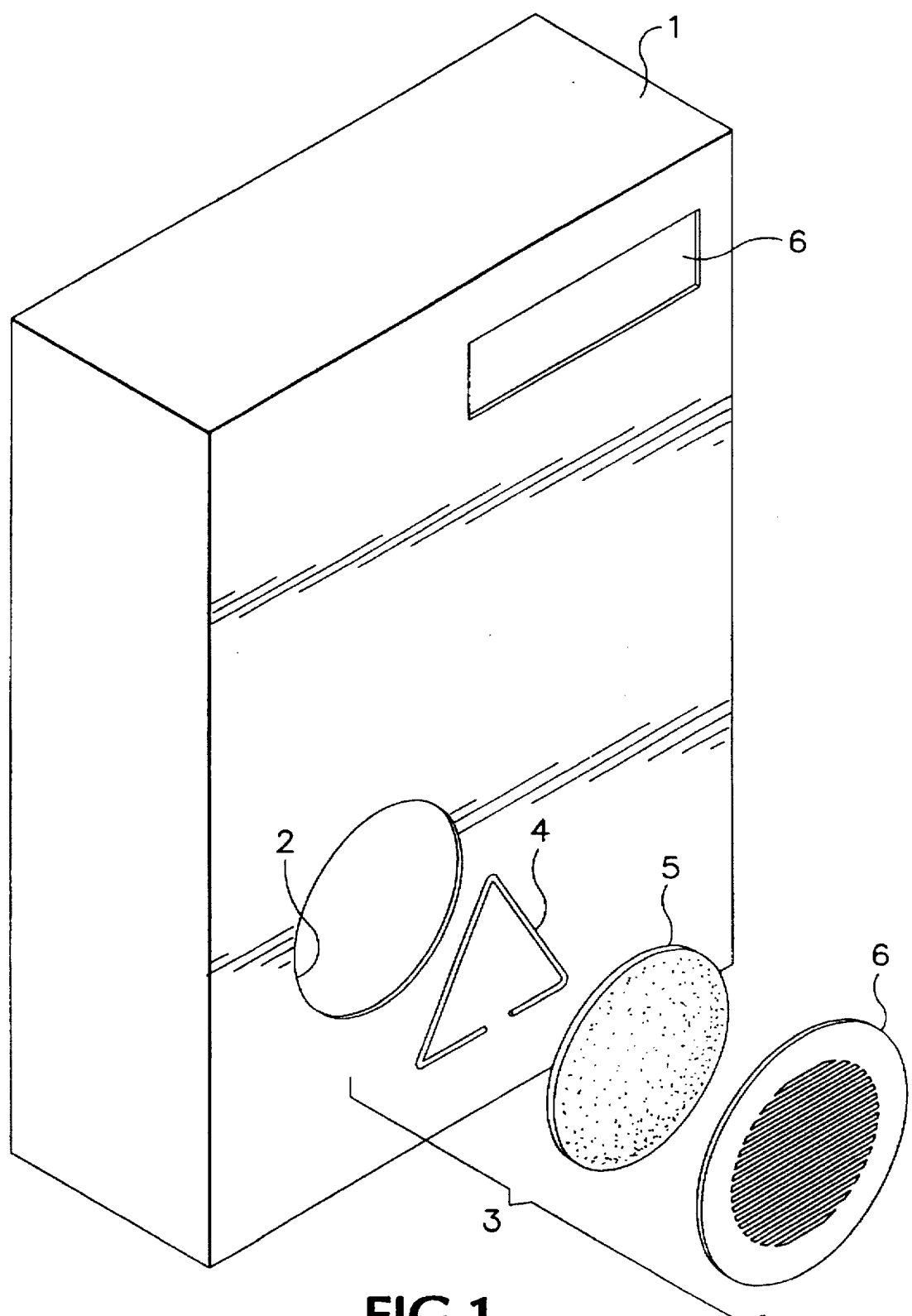
FIG. 1 is a perspective view of an item of electronic equipment with an exploded view of a typical OEM-supplied internal air filtration device.

Referring to the drawings, wherein like numerals refer to the same elements of the invention, there is shown in FIG. 1 an enclosure 1 for an item of electronic equipment such as a computer, together with a conventional OEM-supplied air filtration assembly 3 comprising a wire filter support 4, filter disc 5, and protective grille 6. Typically filtration assembly 3 is mounted over cooling air inlet 2 and inside container 1. Air exhaust 6, which may be located anywhere on the equipment enclosure, permits escape and circulation of the cooling air within enclosure 1.

Figure 2:
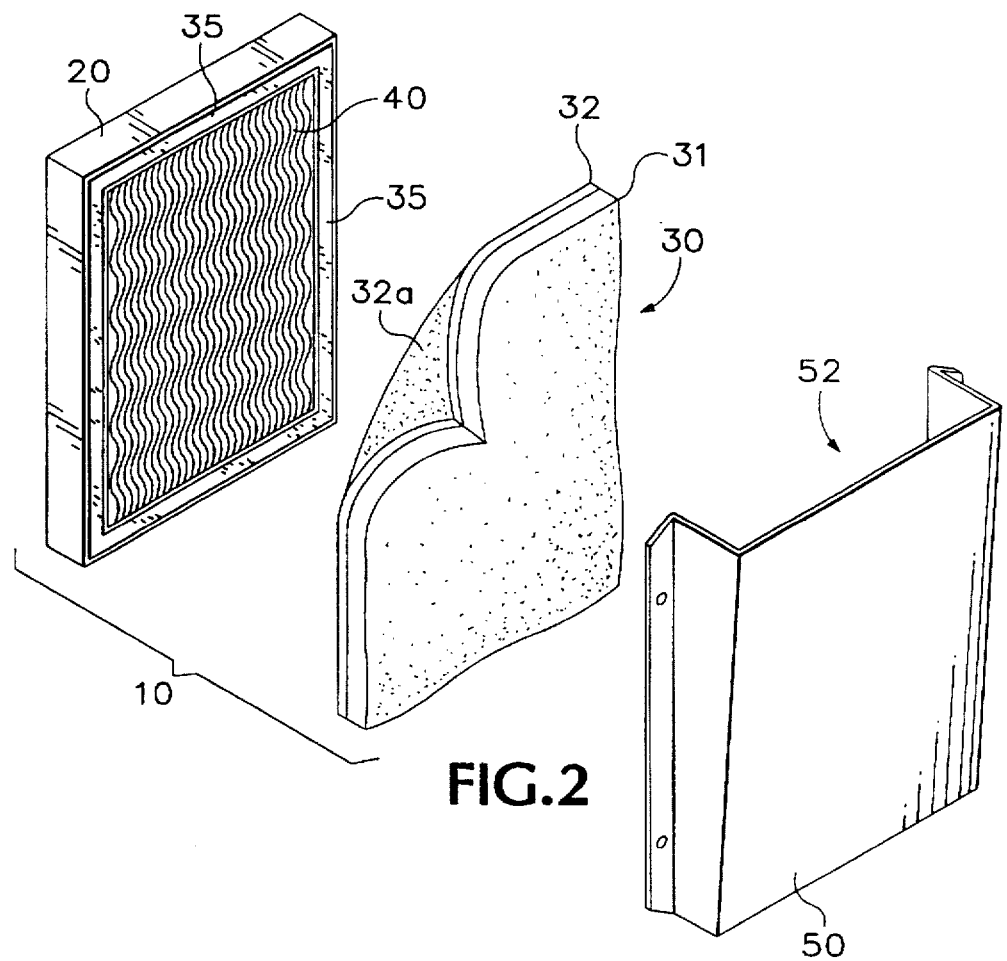
FIG. 2 is a perspective exploded view of the air filter of the present invention, together with a cowling for the same.

In FIG. 2 there is shown the air filtration assembly 10 of the present invention, generally comprising coarse and fine filter media. Housing 20 is adaptable for fitting over an air intake on an item of electronic equipment, the housing 20 containing fine filter media 40 capable of capturing particles ranging in diameter from about 1 to about 500 microns, the media being disposable. In a preferred embodiment, housing 20 and fine filter media 40 are provided as a pre-assembled unit such as may be found in an automobile engine air filter; such units are commercially readily available from auto parts stores as a Fram air filter Model No. CA6828, or a Pro Gauge air filter Model No. PGA-4648.

The air filter assembly 10 includes coarse filter media 30 laid over housing 20 and fine filter media 40. Coarse filter media 30 is capable of capturing particles greater in diameter than about 500 microns, and preferably comprises a two-ply felted polyester media comprising plys 31 and 32 and, although washable and disposable, is preferably simply disposed of after becoming soiled. In a particularly preferred embodiment, coarse filter media 30 contains a non-drying, non-migrating adhesive predominantly on its downstream side 32a, giving the media a "tacky" feel on its downstream side. Such material is commercially available as FIBER-BOND® DUSTLOCK® FP50 material from Fiberbond Corporation, and is available nationwide through Fiberbond® distributors. Coarse filter media 30 is preferably detachably attached to housing 20 so as to be removable therefrom for cleaning and/or disposal. Detachable attachment of coarse filter media 30 to housing 20 is most preferably accomplished by means of thistle cloth 35 VELCRO® hook material pre-mounted on a self-adhesive backing from Minnesota Mining and Manufacturing Company.

Figure 3:
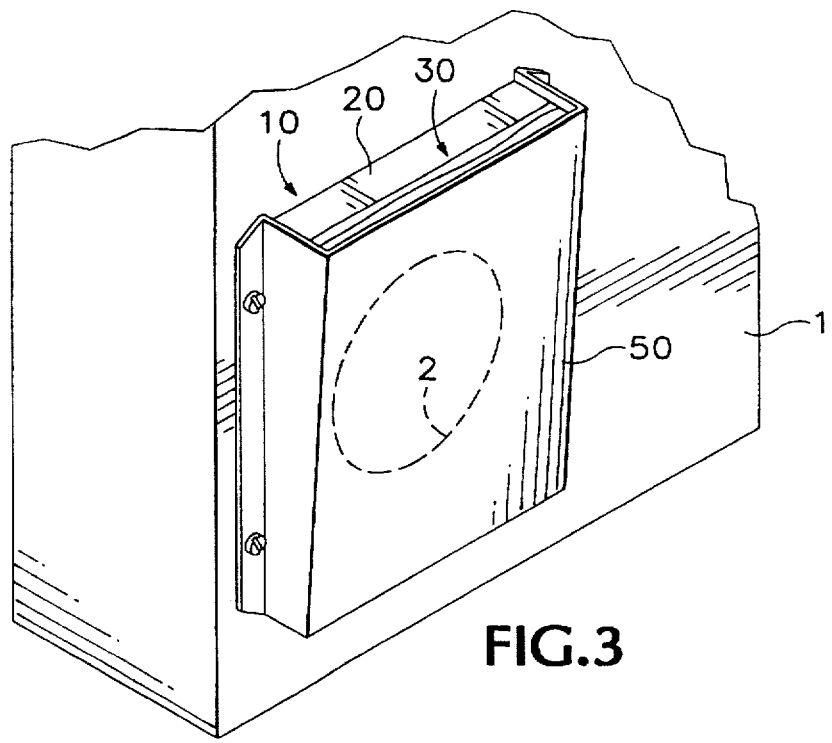
FIG. 3 is a perspective view of an assembled air filter of the present invention in a cowling.

The entire air filter assembly 10 may be placed within a cowling 50 mounted over the air intake 2 of an electronic device, as seen in FIG. 3, the cowling 50 having an open air intake end 52, with the cowling otherwise being closed so as to direct all incoming air through air intake 52 and successively through coarse filter media 30 and fine filter media 40.

EXAMPLE

An air filter of substantially the same design shown in FIG. 2 was fabricated from a Pro Gauge Model No. PGA-4648 serving as housing 20 and fine filter media 40, and having ½-inch strips of self-adhesive-backed Velcro® attached to the upper periphery of housing 20, which detachably secured coarse filter media 30, cut to size to fit over housing 20. A flanged cowling 50 was fabricated from sheet metal and attached by its flanges to the enclosure of an electronic controller unit used in the production of silicon wafers. The dimensions of the cowling were 10 inches long, 5½ inches wide and having an interior height therein from 2½ inches at the back and 3½ inches at the intake 52, with ½-inch wide flanges. Filter assembly 10 and cowling 50 were positioned over the unit's air intake 2, directly over the OEM air filtration assembly 3. Prior to installation of filter assembly 10, frequent build-up around the door seals of the power unit and on the floor of the unit was observed, together with frequent blinding of the OEM filter media 5. Immediately prior to installation of air filter 10, the entire interior of the unit was cleaned. The unit was left in place for 3 months, then removed and the interior of the unit's cabinet was inspected. This was repeated 2 times, for a total time period of 6 months. Even after a period of 6 months, no dust build-up was observable; this was in sharp contrast to very noticeable dust build-up within the same cabinet within one to two weeks when the unit was operated with the OEM filter alone.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. An air filter for electronic equipment comprising:
   (a) a housing permitting fluid communication between an air intake for said equipment and the atmosphere;
   (b) first filter media comprising felted polyester containing a non-drying, non-migrating adhesive, said first filter media capable of capturing particles greater in diameter than about 500 microns and being disposed between said air intake and the atmosphere and detachably attached to said housing by thistle cloth; and (c) second filter media capable of capturing particles ranging in diameter from about 1 to about 500 microns, said second filter media being disposed between said air intake and said first filter media.

2. The filter of claim 1 wherein said polyester of said first filter media is two-ply.

3. The filter of claim 1 wherein said adhesive is predominantly on the downstream side of said first filter media.

4. The filter of claim 1 wherein said second filter media is paper.

5. The filter of claim 1 wherein said first filter media and said second filter media are disposable.

6. The filter of claim 1 including a cowling.

* * * * *